Figure 1:
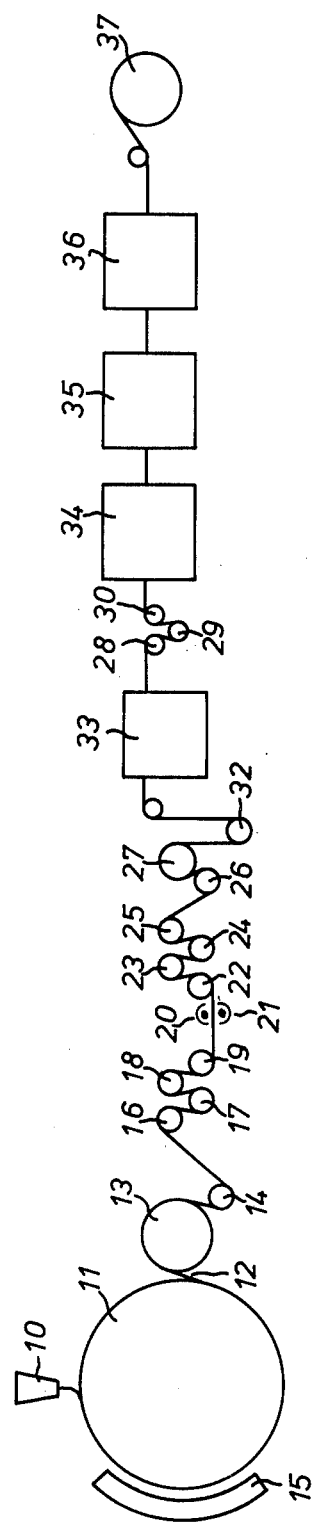

United States Patent [19]  [11] 4,093,695
Heirbaut  [45] June 6, 1978

[54] PROCESS FOR MAKING POLYMERIC FILM

[75] Inventor: Wilfried André Heirbaut, Haasdonk, Belgium

[73] Assignee: AGFA-GEVAERT N.V., Mortsel, Belgium

[21] Appl. No.: 663,497

[22] Filed: Mar. 3, 1976

[30] Foreign Application Priority Data

Mar. 6, 1975 United Kingdom ............... 9401/75

[51] Int. Cl.² .............................................. B29D 7/24
[52] U.S. Cl. .............................. 264/289; 264/342 RE; 264/346
[58] Field of Search ............... 264/289, 235, 342 RE, 264/346

[56] References Cited

U.S. PATENT DOCUMENTS 2,968,065  1/1961  Granholz ............................ 264/289
2,995,779  8/1961  Wiafer ................................. 264/289
3,631,899  1/1972  Erickson ............................. 264/289

Primary Examiner—Jay H. Woo
Attorney, Agent, or Firm—William J. Daniel

[57] ABSTRACT

Method for the production of biaxially molecularly oriented polymeric film with more balanced tensile characteristics across the width, by subjecting the film between the longitudinal and the transverse stretching to an intermediate release treatment comprising maintaining the film at reduced longitudinal tension and at a temperature which is comprised between the second order transition temperature of the film and a temperature which is by 30° C higher.

11 Claims, 2 Drawing Figures

PROCESS FOR MAKING POLYMERIC FILM

The present invention relates to an improved method for biaxially molecularly orienting polymeric film.

A great many of linear, synthetic, organic polymers such as polyethylene terephthalate, are capable of being transformed into translucent or transparent films having excellent physical properties. Some of these properties e.g. tensile strength, impact resistance and flexural strength can be improved further by molecular orientation. For instance, a polyethylene terephthalate film that has been stretched biaxially, e.g. stretched in two directions perpendicular to each other, is a material offering many possibilities of industrial application owing to its excellent physical properties. When such oriented films are submitted to a heat treatment at high temperatures, say above 100° C, they show a high degree of dimensional stability and tensile strength at elevated temperatures up to the temperatures of the heat treatment.

In the customary process for the production of a biaxially oriented, crystallizable, thermoplastic, organic polymer film, such as a polyethylene terephthalate film, the polymer is extruded as a molten film on a quenching drum where it is rapidly cooled to be in a substantially amorphous state, and the quenched film is stretched longitudinally (that is in the direction of extrusion) to the desired extent between rollers rotating at different speeds. Then, the film is stretched transversely in a transverse stretching device comprising means for engaging the edges of the film and making them follow diverging paths. After this transverse stretching, the film is heat-set.

During the transverse stretching of a longitudinally stretched film, the central portion of the film sometimes lags behind the edges of the film which are guided under tension, and a uniform balance of properties across the film is not obtained.

After biaxial stretching, the film is passed in a heat-setting zone maintained at a temperature which is between 30° and 140° C higher than that in the transverse stretching zone, but lower than the crystalline melting temperature range of the film. During the passage of the film through the heat-setting zone, lagging of the central portion of the film occurs to a marked extent.

Biaxially stretched films often exhibit appreciable anisotropy with respect to their elasticity moduli. In other words there is a marked imbalance in the tensile characteristics of the oriented film. In the description hereinafter the anisotropy at any given point of a film will be expressed by the ratio of the Young's moduli $ER^1$ and $ER^2$ measured according to the main directions of orientation of $R^1$ and $R^2$ of the film. The main directions of orientation are the directions of extrusion as they may be determined by means of a polariscope.

The aforesaid anisotropy has been mainly attributed to the lagging of the central part of the film during its treatment as above referred to. It has been proposed to produce film wherein the lagging is zero or almost so by conducting a biaxially stretched film through a heat-shrinking zone in which the temperature is equal to or higher than the temperature in the zone in which the transverse stretching occurs, but at least 10° C lower than the temperature at which the film is subsequently heat-set, while allowing the central portion of the film to lag behind the edges of the film during its movement through such heat-shrinking zone, and conducting the film in a reversed condition, that is the former leading end of the film is now in trailing position, through a heat-setting zone while allowing the central film portion to lag behind the film edges. The mentioned technique is disclosed in United Kingdom Patent Specification No. 1,162,677 filed Nov. 26, 1965 by Gevaert-Agfa N.V. and, while affording very good results, its application in practice is difficult since it is essentially a discontinuous process requiring supplemental cutting and splicing stations, accumulating devices and storage space.

The present invention aims to provide a method whereby biaxially stretched polymer film can be produced without the need for such discontinuity and whereby favourably low anisotropy can be promoted.

It appears that during longitudinal stretching of a film, internal stresses are created and are "frozen" in the film by cooling of the film at the end of its longitudinal stretching. These stresses can be considered as chains of molecules of the polymer which are in a very unstable condition, tending to give the film a stable shape in accordance with its internal structure. These internal stresses are set free during the transverse stretching of the film and the subsequent heat-setting of the film. Such internal stresses can cause so-called "lagging" described hereinbefore.

The present invention is based on the discovery that by removing or reducing such internal stresses after the longitudinal stretching and before the transverse stretching of the film a better balance of tensile properties can be achieved. Sometimes this stress release leads to a reduction of lagging during the subsequent treatment of the film, but it has become apparent that, contrary to previous belief, lagging is not necessarily associated with poor balance in tensile characteristics.

This is believed to be due to the fact that, apart from lagging, there is also another parameter which may be determinant for the anisotropy of a film, namely the density of the pattern of the c-axes, that are the axes of crystallinity, of the film. Thus, whereas the shape of the c-axes pattern of the film is mainly determined by the lagging of the film, the density of such pattern, that is the number of c-axes in one direction of the biaxially oriented film, may be influenced by the thermal treatment of the film and so it may occur that in some cases the anisotropy of a film may be reduced while yet the lagging has increased.

According to the present invention, a method for biaxially molecularly orienting polymeric film which comprises the successive steps of stretching a substantially amorphous crystallizable, polymeric film in its longitudinal direction at a temperature between the second order transition temperature of the film and about 50° C above said transition temperature, and stretching said film in the transverse direction at a temperature between the second order transition temperature of the film and about 50° C above said transition temperature, is characterized thereby that the film is subjected between the longitudinal and transverse stretching to an intermediate release treatment wherein for a period of time the film is at a temperature between the second order transition temperature and about 30° C above said temperature and is subjected to a longitudinal tension which is smaller than the longitudinal tension applied during the longitudinal stretching of the film.

The characterizing feature of the present invention should be distinguished from the treatment known in the art as "heat-relaxing" and which is carried out after the step of heat-setting a film in those cases where a film with a very good dimensional stability for temperatures over 100° C is required. The mentioned step of heat-relaxing does not have any effect on the anisotropy or variations thereof of the film.

It will be understood that the treatment of the film for some time at a temperature above the second order transition temperature prior to the transverse stretching of the film, may give rise to a more or less increase of the crystallization of the film whereby oriented chains are transformed into crystallized ones so that transverse stretching may become difficult. Therefore, it is desirable when carrying out a method according to the invention, not to increase the crystallinity of the film between the longitudinal and the transverse stretching by a value greater than 5%. A preferred but optional technique for avoiding notable crystallization of the film during the intermediate release treatment according to the invention, comprises maintaining the film at a temperature between the second order transition temperature and a temperature which is by 10° C higher than said temperature, and during a period of time which is not greater than 20 seconds. It is very satisfactory for the release treatment to occur at a temperature ranging between said transition temperature and 5° C above it and to proceed during a period of time which is not greater than 5 seconds.

The tension to which the film is subjected is preferably not greater than half the tension applied during the longitudinal stretching of the film. According to further preference the film tension during the intermediate treatment is from 0 to 200 g/sq.mm. It will be understood that the realization of a tension of 0 g/sq.mm requires particular measures in practice since normally the mass of the film itself causes inevitably a certain tensioning under the influence of gravity.

Thus for most practical purposes it should be considered that said zero value is merely indicative of the very low longitudinal tensioning to which the film may be subjected in carrying out the method according to the invention.

When carrying out the release treatment according to the invention, it is unimportant in which way heat is supplied to the film for maintaining it at the desired temperature. The film may be heated by a heat transferring medium such as vapour under atmospheric pressure, heated air or any other heated gas, or the heating may also occur by radiation or by contact heating, e.g. by immersion in a heated liquid.

A film which has received the particular treatment according to the invention and which has thereafter been stretched transversely, is preferably subjected to after-treatments to further improve its properties. These treatments may include heat-setting, heat-relaxing, longitudinal after-stretching, etc. During the different treatments to improve its mechanical properties, the film may also undergo other treatments which do not directly affect said properties. Such other treatments may include a corona-discharge treatment to improve the adhesion of the film surface for aqueous and other types of layers, the coating of one or more subbing layers, either after the biaxial stretching or between the longitudinal and the transverse stretching of the film, etc.

In the description hereinafter, reference will be particularly made to polyethylene terephthalate since it is a material that has excellent properties as a base for photographic film and for magnetic recording tape, but it will be understood that the method according to the present invention is suitable for use in the production of film from polymers other than polyethylene terephthalate which polymers are suited for biaxial stretching. Some of these polymers are polyvinylidene chloride and copolymers thereof, polyamides, polystyrene and its copolymers, polycarbonates, etc.

Figure 2:
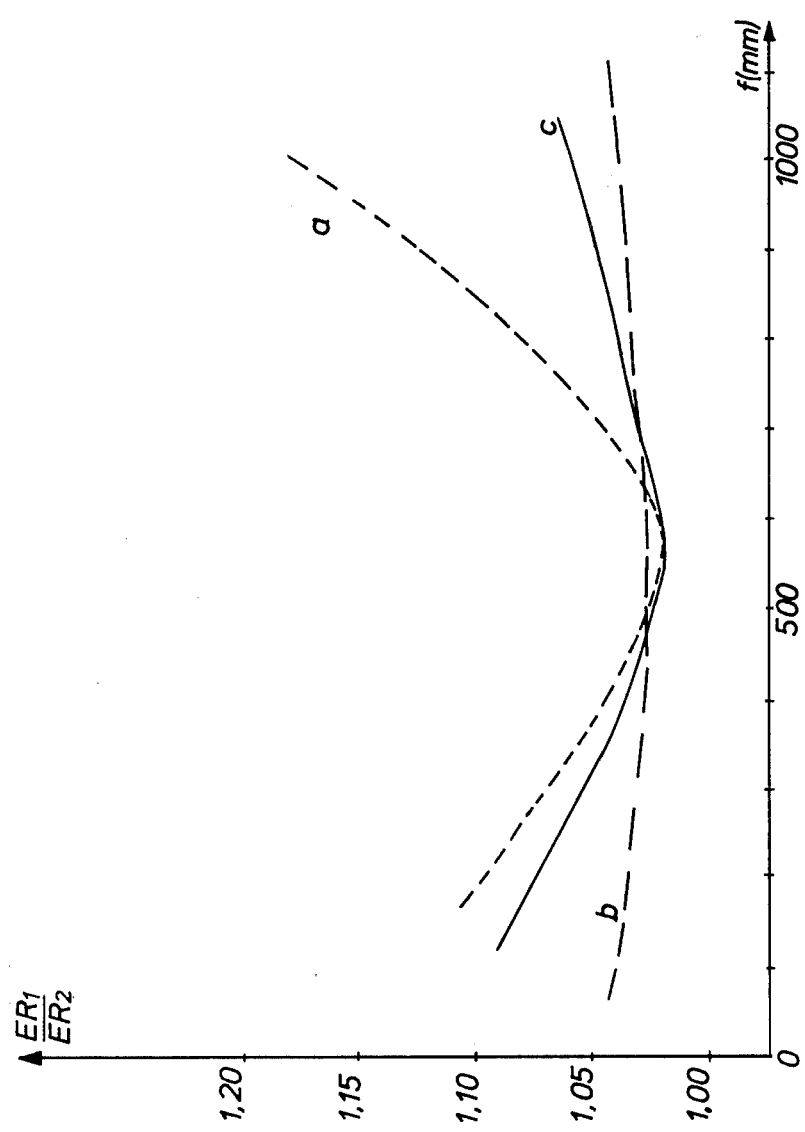

The invention will now be described by way of example with reference to the accompanying figures wherein:

FIG. 1 is a diagrammatic illustration of an arrangement for carrying out the method according to the present invention, and FIG. 2 is a graph illustrating the anisotropy of a heat-set film treated in accordance with the invention, according to the width of the film.

Referring to FIG. 1, a polymer is extruded as a molten curtain through an elongate extrusion opening of an extrusion die 10 onto a quenching drum 11. The temperature of the molten polymer is rapidly lowered to below the second order transition temperature of the polymer on the quenching drum so that a substantially amorphous film 12 may be pulled from the quenching drum by the rollers 13 and 14.

The surface appearance of the film side which is contacted by the quenching drum may be improved, if desirable, by electrostatically pinning the film to the peripheral surface of the drum. Means known in the art comprise the electrostatic charging of the film by means of a corona-discharge device disposed in the gap between the extrusion die and the quenching drum, or the electrostatic attraction of the film onto the quenching surface by maintaining said surface at an elevated potential with respect to the ground potential.

Techniques for improving the quenching of the film include the cooling of the film surface which is remote of the quenching drum by means of a cooler as illustrated by the numeral 15 for directing streams of a cooled gas onto the film, or the application of a layer of a heat-transfer liquid between the film and the quenching drum.

The film 12 is passed over heated rollers 16 to 19 which are driven at equal speeds and which raise the temperature of the film to a value slightly below the temperature of longitudinal stretching. The film is longitudinally stretched in the zone between the last roller 19 of the mentioned series of rollers 16 and 19 and the first roller 22 of a series of rapidly rotating cooled rollers 22 to 25. The film is weakened in said zone by heating it to a temperature slightly above, and preferably between 10° and 30° C above, its second order transition temperature, by infra-red rodlike heaters 20 and 21, and the longitudinal stretching of the film practically occurs over a distance comprised between said infra-red heaters and the line of first contact of the film with the first cooled roller 22.

The film is then passed over film transport rollers 26 and 27 which may be at room temperature and which rotate at the same peripheral speed as the roller 25. A series of film transport rollers 28 to 30 is driven by motor means, not shown, which is controlled by the vertical position of a so-called dancer roller 32. The mass of the dancer roller determines the longitudinal tension in the film between the two mentioned series of film transport rollers. A station 33 through which the film is conveyed at said given longitudinal tension is provided with means, known in the art, for heating the film to a temperature which may be comprised between the second order transition temperature of the film and a value of about 30° C above said temperature in order to perform the intermediate release treatment of the film in accordance with the invention.

The film is thereafter introduced into a lateral stretching device 34 which may comprise, as known in the art, two endless chain mechanisms, one at each edge of the film which carry a great number of film clamps. The film clamps are made to follow diverging paths so that the film edges which have been gripped by the clamps at the entry of the stretching device are progressively moved further away from each other as they move towards the exit end of the device. The film which has been heated to a temperature between 0° and 50° C above its second order transition temperature, is transversely oriented in said device 34.

The biaxially stretched film may undergo further treatments to improve its mechanical properties and its dimensional stability, such as heat-setting in a station 35 and heat-relaxing in a station 36. The film is finally wound to a roll 37. The following examples illustrate the invention.

EXAMPLE 1

A polyethylene terephthalate polymer having an inherent viscosity of 0.57 dl.g$^{-1}$ and a specific density of 1.33 g.cm$^{-3}$ is extruded at a rate of 750 kg.h$^{-1}$ and at a temperature of 290° C through a flat extension die having an orifice measuring 535 by 2.5 mm. The molten polymer is received on the quenching drum 11 which is rotated at a rate of 10 m.min$^{-1}$ and is maintained at a temperature of about 15° C. The width of the film leaving the quenching drum amounts to 505 mm and the film thickness is 1.4 mm. The film is heated by the rollers 16 to 19 rotating at a rate of 10 m.min$^{-1}$ to a temperature of about 70° C, the second order transition temperature of the polymer being about 69° C. Subsequently the film is weakened by the infra-red heaters and then pulled by the rollers 22 to 25 having a temperature of 30° C and rotating at a rate of 37 m.min$^{-1}$ bringing about a longitudinal stretch ratio of the film of 3.7. The longitudinal tension in the film during the longitudinal stretching amounted to 400 g/sq.mm.

The film is passed through the intermediate treatment station 33 where blowers for heated air are positioned for raising the film temperature to the values which are listed hereinafter in table I. The roller 32 was adjusted to provide a longitudinal film tension of about 10 g/sq.mm.

The film was then stretched transversely at a ratio of 3.5 at a temperature of about 100° C and finally heat-set at a temperature of 220° C. Heat-relaxing of the film was not carried out. The following table I illustrates the lagging of heat-set film according to its width, for three different film samples. The lagging is expressed as the distance over which the centre of the film has been displaced in the longitudinal direction of the film with respect to the edges, and the measurement thereof occurs in practice by measuring the height of the arc into which a straight line which is drawn onto the film directly after its quenching, is transformed. The sample a is a film which has been maintained at a temperature of 20° C in the station 33, the sample b is a film which has been maintained for 5 seconds at a temperature of 75 ° C in said station, and sample c is a film which has been maintained for 5 seconds at a temperature of 82° C in the station 33.

Table I

| Sample | Measured film temp. | Lagging of heat-set film |
|---|---|---|
| a | 20° C | 40 mm |
| b | 75° C | 27 mm |
| c | 82° C | 43 mm |

It appears that the intermediate release-treatment at 75° C results in a lagging which is smaller than that of a non-treated film sample whereas an intermediate treatment at 85° C causes a slightly increased lagging.

The greater lagging of sample c does not point to less good properties. On the contrary, it may be seen in the graph of FIG. 2 where the anisotropy is plotted as the ratio of the young's moduli $ER_1$ and $ER_2$ versus the film width f expressed in mm, that the variations in the anisotropy of sample c still are less great than the corresponding variations of the non-treated sample a. The same is true a fortiori for the sample b.

The crystallinity of the three samples before their transverse stretching and after their heat-setting, is mentioned in the table II hereinafter wherein 1, m, and r stand for the left, the middle and the right side, respectively, of the film.

Table II

| Sample | Crystallinity in% | | | | | |
|---|---|---|---|---|---|---|
| | before transverse stretching | | | after heat-setting | | |
| | l | m | r | l | m | r |
| a | 23.6 | 23.5 | 23.4 | 50.4 | 50.4 | 50.4 |
| b | 22.7 | 22.4 | 21.8 | 50.2 | 50.6 | 50.2 |
| c | 24.8 | 25.0 | 24.1 | 49.8 | 49.9 | 49.9 |

It appears that the intermediate treatment according to the invention did not cause any notable increase of the crystallinity of the film.

EXAMPLE 2

A polyethylene terephthalate polymer having an inherent viscosity of 0.57 dl.g$^{-1}$ and a specific density of 1.33 g.cm$^{-3}$ is extruded at a rate of 1500 kg.h$^{-1}$ and at a temperature of 290° C through a flat extrusion die having an orifice measuring 1160 by 2.5 mm. The molten polymer is received on the quenching drum 11 which is rotated at a rate of 7 m.min$^{-1}$ and is maintained at a temperature of about 15° C. The film is longitudinally stretched at a temperature of 100° C to a stretch ratio of 3.6, while a longitudinal tension of 400 g/sq.mm is maintained.

The film is then subjected to the intermediate treatment according to the invention by maintaining it during a period of 5 seconds at a temperature between the second order transition temperature of the film and a temperature that is by b 30° C higher. Table III hereinafter illustrates the lagging of five film samples numbered 1 to 5 as compared with a reference film sample, for different temperature of the film samples in station 33. The longitudinal film tension in said station was adjusted to 160 g/sq.mm. The film was thereafter transversely stretched to a ratio of 3.6 and finally heat-set at a temperature of 200° C.

Table III

| Sample | Film temperature | Lagging of heat-set film |
|---|---|---|
| 1 | 70° C | 119 mm |
| 2 | 73° C | 123 mm |
| 3 | 75° C | 122 mm |
| 4 | 78° C | 121 mm |

Table III-continued

| Sample | Film temperature | Lagging of heat-set film |
|---|---|---|
| 5 | 80° C | 121 mm |
| ref. | 30° C | 160 mm |

The anisotropy profile according to the width of the film for the different adjustments of the air temperature of the station 33 is illustrated by the figures of table IV hereinafter wherein the anisotropy of the film is mentioned for the left, the middle and the right side of the film.

Table IV

| Sample | Anisotropy | | |
|---|---|---|---|
| | l | m | r |
| 1 | 1.25 | 1.18 | 1.25 |
| 2 | 1.24 | 1.19 | 1.26 |
| 3 | 1.26 | 1.20 | 1.25 |
| 4 | 1.22 | 1.17 | 1.23 |
| 5 | 1.25 | 1.22 | 1.25 |
| ref. | 1.32 | 1.15 | 1.33 |

The improvement of the anisotropy of the five samples treated in accordance with the invention over the reference sample is clear. Attention should also be given to the smaller variation of the anisotropy over the width of the film of the five samples as compared with the variation of the anisotropy of the reference sample.

In carrying out the method according to the present invention, it has been shown that some types of film may show a tendency to curl during the intermediate release-treatment, and as a consequence thereof serious difficulties may arise with the gripping of the film edges by the clamps of the device for the transverse stretching of the film.

The mentioned tendency to curl is particularly noticeable in case the temperature of the heat-release treatment is more than 10° C above the second order transition temperature of the polymer. One reason for the said tendency to curl may be formed by a coating, for instance a subbing layer, which has been applied to the film between the longitudinal and the transverse stretching of the film, and the thickness of which is not uniform or the width of which does not cover the full film width. The latter situation is quite usual since the film margins are often kept free of coating with the intention to facilitate their recycling as they have been trimmed off in a further stage of the film treatment.

Another, and in practice a more serious cause for the curling tendency of a film is the asymmetric heat treatment of a film during the operations prior to the intermediate release treatment.

These operations include the quenching and the longitudinal stretching of the film, and the term "asymmetric" points to differences considered according to the thickness of the film, that is in a direction normal to the film surface. By far the most important cause for said asymmetric treatment of the film is the cooling of the film by contact of one film face only with a cooled surface.

For instance, the quenching of the film occurs substantially by contact of the concavely curved side of the film with the quenching drum 11. The remote convexly curved film side is cooled by contact with the air and since the latter cooling is much less effective, the film undergoes in fact an asymmetric treatment whereby stresses are induced in the film which may cause the described curling of the film in the station 33. The same is true for the cooling of the film on the first roller 22 of the rapidly rotating rollers of the longitudinal stretcher. The desired effect can be particularly noticed when relative thick film is being produced, that is film having an initial thickness at extrusion greater than 2 to 3 mm. Thus it may be desirable to consider in certain cases a more symmetric cooling treatment of the film in order to avoid the described difficulty.

One measure for carrying out a more symmetric cooling is to additionally cool the air-side of the film during the quenching step, and this may be done by a device such as illustrated by numeral 15 in FIG. 1 for blowing cool air onto the film. An other measure is to cool the film by contacting both surfaces of the molten film in rapid sequence with a great plurality of relatively small cooling rollers as disclosed for instance in DT(OS) No. 1,704,720 filed Feb. 23, 1968 by Hench Hans in order to more symmetrically quench the film. Still an other measure comprises guiding the molten film curtain vertically downwardly into a bath of liquid in order to perfectly symmetrically cool the film as disclosed for instance in U.S. Pat. No. 2,941,254 of Isadore Schwerlick issued June 21, 1960.

The latter technique may also, and in the case of a film which is being provided with a subbing layer after the longitudinal stretching and before the intermediate release treatment, even perferably be used for cooling the film after the longitudinal stretching, the roller 22 being in such case immersed in a coolant liquid bath, and the film path from the roller 19 to the roller 22 running vertically downwardly, as disclosed for instance in United Kingdom Patent No. 1,057,077 filed Sept. 7, 1964 by Imperial Chemical Industries Limited.

The heating of the film appears to be much less responsible for an occasional asymmetric character of the film and thus it will in practice be hardly necessary to substantially modify existing arrangements in order to conveniently carry out the method according to the invention.

We claim:

1. In a method for biaxially molecularly orienting polyester film comprising the successive steps of stretching a substantially amorphous crystallizable, polyester film in its longitudinal direction at a film temperature between the second order transition temperature of the film and about 50° C above said transition temperature, and stretching said film in the transverse direction at a temperature between the second order transition temperature of the film and about 50° C above said transition temperature, the improvement wherein between the longitudinal and transverse stretching steps the film is subjected to a thermal stress-relieving treatment by maintaining the film at a temperature which is between the second order transition temperature and about 30° C above said temperature and below the initial stretching temperature for a time insufficient to substantially increase its crystallinity, while the film is being subjected to a longitudinal tension which is not greater than half the longitudinal tension applied during the longitudinal stretching of the film.

2. Method according to claim 1, wherein said longitudinal film tension during said intermediate treatment is not greater than 200 g/sq.mm.

3. Method according to claim 1, wherein the temperature of the film during said intermediate release-treatment is comprised between the second order transition temperature of the film and a temperature that is by 10° C higher.

4. Method according to claim 1, wherein the period during which the film is exposed to said intermediate release treatment, is not greater than 20 seconds.

5. Method according to claim 1, wherein the time of said treatment is such that the increase in crystallinity of the film resulting from said treatment is not greater than 5%.

6. Method according to claim 1, wherein said film is symmetrically cooled immediately following its longitudinal stretching.

7. Method according to claim 6, wherein said cooling occurs by conducting said film vertically downwardly into a bath of coolant liquid.

8. Method according to claim 1, wherein the transverse stretching step is followed by a heat-setting step.

9. Method according to claim 8, wherein the heat-setting step is followed by a heat-relaxing step.

10. Method according to claim 1, wherein said polymeric film is polyethylene terephthalate.

11. A method for continuosly biaxially orienting polyester film according to claim 1 wherein a continuous length of said film is passed through a longitudinal stretching zone comprising two sets of feed rollers, the second of which is driven at a speed sufficiently greater than the first to stretch said film, while being heated within said zone, downstream of said zone the tension in said film is monitored and the speed of advance of the film is regulated in accordance with said monitoring to reduce the film tension below the tension therein within said longitudinal stretching zone, and thereafter the film is passed through a transverse stretching zone in which the film side margins are spread apart while the film is being advanced.

* * * * *